United States Patent [19]
Morita

[11] 3,987,575
[45] Oct. 26, 1976

[54] FISHING LURE
[75] Inventor: Toshio Morita, Toronto, Canada
[73] Assignee: Lawrence Peska Associates, Inc., New York, N.Y. ; a part interest
[22] Filed: Sept. 15, 1975
[21] Appl. No.: 613,632

[52] U.S. Cl. .............................................. 43/42.06
[51] Int. Cl.² ......................................... A01K 85/00
[58] Field of Search ................................... 43/42.06

[56] References Cited
UNITED STATES PATENTS

| | | | |
|---|---|---|---|
| 2,008,004 | 7/1935 | Catarau | 43/42.06 |
| 2,091,457 | 8/1937 | Sauer | 43/42.06 |
| 2,383,246 | 8/1945 | Fiskaali | 43/42.06 |
| 2,674,058 | 4/1954 | Lindenberg | 43/42.06 |
| 2,703,945 | 3/1955 | Johnson | 43/42.06 |
| 2,968,886 | 1/1961 | Cotroumpas | 43/42.06 |
| 3,066,434 | 12/1962 | Duller | 43/42.06 |
| 3,688,430 | 9/1972 | Balch | 43/42.06 |

*Primary Examiner*—Warner H. Camp

[57] ABSTRACT

A fishing lure or plug device which contains self chumming means for attracting fish to the lure for biting thereon. The lure is shaped like a bait fish or in any usual shape of fish lure, spoon or the like, and has hooks attached to it, and eyelet means for attachment to a leader line to the fisherman or his reel. The lure body has a chamber formed therein for receiving a liquid container in the form of a vial or capsule containing a liquid such as fish oil, cod liver oil, or other fish derived oil which is attractive to the fish being sought, the chamber being open at one or both ends with a retaining spring to retain the oil capsule therein, so that by puncturing the vial or capsule, the oil is dribbled out and entrained with the water to attract the fish.

5 Claims, 4 Drawing Figures

FISHING LURE

This invention relates to improvements in fishing lures and fish enticing and hooking devices.

The present invention provides a novel and improved fishing lure device which is designed to attract fish by discharging a liquid into the water that is attractive to the fish being sought by the fisherman.

SUMMARY OF THE INVENTION

It is the primary object of the present invention to provide a novel and improved fishing lure, the body of which may be of any well known or novel types of contour, coloration or shape, for attracting the fish to bite thereon, and which has a hollow area for supporting a container of liquid attractive to the fish known or believed to be in the waters, with means for dispensing of the liquid into the water as the lure is placed in the water or pulled along, as in trolling.

A further object of the invention is to provide a novel and improved fishing lure or plug device which has the outward appearance and coloration of any desired or known type of lure or plug, but instead of relying solely on its appearance to the fish, it also additionally provides its own "chumming" means for attracting the fish to bite thereon, by discharging into the water a liquid such as a fish oil to lure the fish to bite on what would be a more lifelike appearing fishing lure or plug than one without the liquid oil effluent.

Still another object of the invention is to provide a novel and improved fishing lure or plug device which is simple in design, may be made of one or more parts depending upon the desires of the fisherman, and which parts may be movable to more closely simulate the appearance of a live fish, and wherein one of the parts of the lure body is made hollow to form a chamber containing a vial or capsule of the liquid fish oil or the like, and means for discharging the oil into the water.

Still a further object of the invention is to provide a novel and improved fishing lure or plug which can be made at low cost, by relatively inexperienced labor or even by hand, and can be made in quantities by mass production methods, plastic molding or the like, and of any desired materials.

BACKGROUND OF THE INVENTION

In connection with the sport and business of fishing, one of the big problems is that of lure construction which will result in attracting the fish to bite on the lure or plug. Many attempts have been made to make up a fishing lure or plug which will be irresistable to the fish so it will bite on the lure bait. In use of some spoon types of lures, it is only the tin flat or curved metal of the spoon which is depended upon, by light flashing from its shiny metal surface, or something else, to get the fish to bite, and this does work under some circumstances, and with some fish, and on some weather and water temperature conditions.

However, as is well known, especially to fishing party boat captains, more is required to lure the fish to the area so that all the customers can at least expect to have some reasonable chance of success in hooking some fish. This is done in many cases by chumming, that is to say, ground up bait fish is dropped into the water, to lure the fish in large numbers into waters near the fishing boat, so that the fishermen can drop their lines into the water, and at least know that they can try out their various types of lures to hook the fish.

This, of course, is quite expensive, and beyond the reach of the average fisherman who may be fishing alone or from a small rowboat in quite isolated waters, a lake or river. The present invention seeks to provide the advantages of chumming for the individual fisherman, without the great expense. Here the fishing lure is equipped with its own chumming means, in the form of a vial or container of a fish oil or other oil, which is tremendously attractive to fish, and which is dispensed from the lure itself into the water to attract the fish directly to the lure and to bite on it, as seemingly a bait fish.

BRIEF DESCRIPTION OF THE DRAWINGS

The foregoing and other objects, features and advantages of the invention will become apparent from the following description of a preferred embodiment thereof, as illustrated in the accompanying drawings, forming a part hereof, wherein.

DETAILED DESCRIPTION OF THE PREFERRED EMBODIMENT

In order to understand clearly the nature of the invention and the best means for carrying it out, reference may be had to the drawings, in which like numerals denote similar parts through the several views.

As shown, there is a fishing lure 10 which includes a main lower body portion 12, and an upper body portion 14 carried thereby, the lower body portion being shaped in any desired manner to lure the particular fish to be encountered. The lure may be made of any suitable material, such as plastics, molded wood or metal or carved from such materials by hand or machine, depending upon whether it is being made on a small scale, such as by an individual fisherman for his own use, or for mass production.

Figure 3:
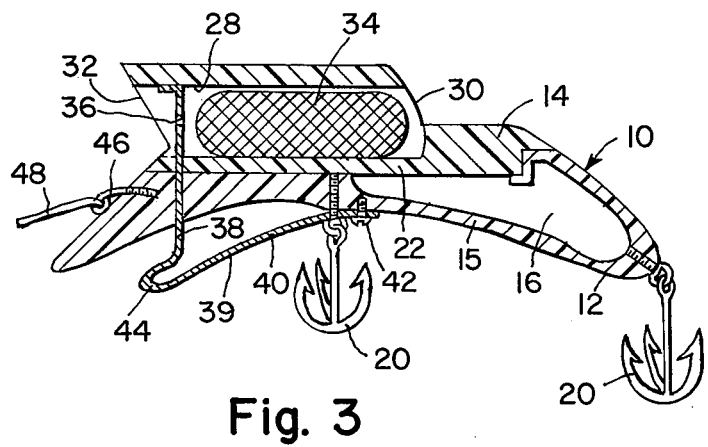
FIG. 3 is a vertical sectional elevational view taken substantially on Plane 3—3 of FIG. 2.
Figure 4:
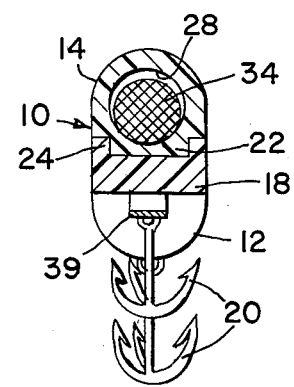
FIG. 4 is a transverse sectional elevational view taken substantially on Plane 4—4 of FIG. 1.

At the tail end portion 15 of the lower body 12, there may be a hollow chamber 16, which may provide some degree of flotation, or lighten the overall weight of the lure, as desired. The head end portion 18 of the body portion 12 may be made solid as seen in FIGS. 3 and 4. Hooks 20 are attached by swivel couplings to the various portions of the lower body 12 for hooking the fish.

Figure 2:
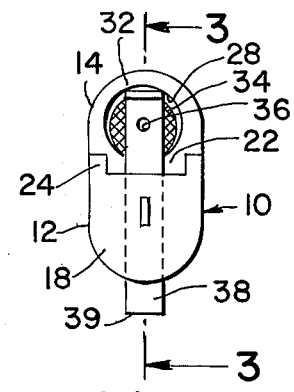
FIG. 2 is a left end elevational view of the lure of FIG. 1.

The upper body portion 14 has a lower extension 22 which fits into the space between the upstanding rail flanges 24 of the lower body portion, as seen best in FIGS. 2 and 4, and may be secured therein by force fit, adhesives or other means. According to a modified form, the rail flanges 24 may be inwardly extending to form tracks into which the upper portion 14 may be slidably fitted into place. The upper body portion has a hollow capsule chamber 28 formed therein, which may be cylindrical in shape, and open at its tail end 30, and at its head end 32, so that the surrounding ambient water is free to enter and flow therethrough, so as to pick up the fish oil from the capsule 34 which is disposed in the chamber 28.

The capsule or vial 34 which is disposed in the chamber 28, may be of any suitable type for the use as needed, such as a gelatine capsule of a type which is commonly used in pharmaceuticals, for administering medicinal oils, and which dissolves in the stomach of the patient. In order to puncture the capsule to release the oil, a small hole 36 is formed in the upstanding spring arm 38 of the retaining spring member 39, to allow insertion of a pin or needle by the fisherman when he is ready to commence using the lure and to release the fish oil into the water.

Or a small pin prong may be formed on the spring arm 38 for puncturing the capsule after it is inserted in the capsule chamber. The spring member 39 is secured on its lower arm portion 40 by any suitable means, such as a set screw 42 into the lower body portion, or adhesively or otherwise, so that its upstanding upper arm 38 extends through an opening formed through the lower body, as shown in FIG. 3, and into the left end of the capsule chamber 28. To insert an oil capsule, the middle portion 44 of the spring member 39 is pulled downwardly as seen in FIGS. 1 and 3, allowing the capsule to be inserted into the capsule chamber, and then springs up to retain the capsule therein.

Figure 1:
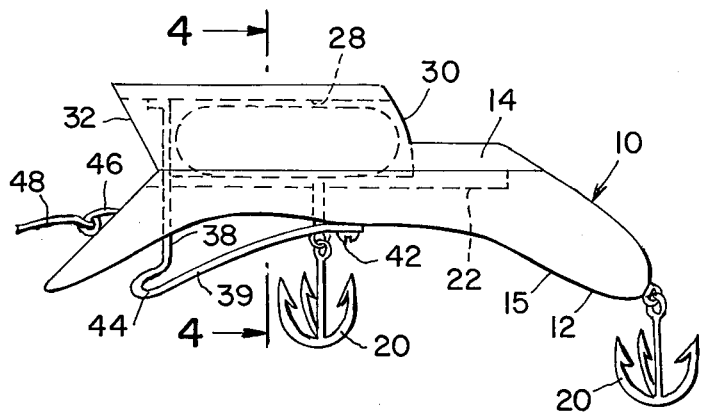
FIG. 1 is a side elevational view of a fishing lure or plug device according to the invention.

As seen in FIGS. 1 and 3, an eye member 46 is anchored in the lower body portion of the lure, so that a leader line 48 may be attached thereto, and ultimately to the reel of the fisherman for playing the lure in the water. While it is preferred to use a soft gelatine type of oil capsule 34, it is understood that the oil may also be contained in a small plastic, glass or metal vial with a soft rubber or plastic discharge end which may be opened or punctured by a needle to release its oil contents. Also, while cod liver oil has been mentioned as a preferred oil for this purpose, it is understood that this by way of example only, and that other oils, both of a fish origin or other oils, may be found to be useful in luring the fish to bite, and such oils or liquids may also be used. A fish head may be attached to the lure head end, with suitable openings to allow influx of water therein.

Although I have described my invention in specific terms, it is understood that various changes may be made in size, shape, materials and arrangement without departing from the spirit and scope of the invention as claimed.

What is claimed is:

1. A fishing lure device comprising an elongated main lure body means, hook means carried by said main lure body means for hooking a fish, leader engaging means carried by the front of said main lure body means for selected engagement with a leader for manipulating the fishing lure in the water, said main lure body means having a chamber formed therein for reception of a container of a liquid for discharge therefrom for luring fish thereto, said chamber extending in a direction substantially parallel to the longitudinal axis of said main lure body means and having a first opening of a size for insertion therein of said liquid container and a second opening therein spaced from said first opening of a size for discharge of said liquid from said container by the flow of surrounding water through said main lure body from said first to second openings entraining liquid discharged from said container, but of insufficient size to enable said container to pass therethrough, and spring lever detent means mounted on said main lure body means retractable and insertable in said chamber adjacent said first opening for selectively locking and blocking said opening for insertion and withdrawal of said liquid container and for holding said container in said chamber, said spring lever detent means including a resilient planar spring member having a lower arm portion attached to the bottom of said main lure body and an upstanding arm portion connected to said lower arm portion for reciprocating movement in a direction substantially perpendicular to the lure body axis by a finger engageable middle portion, said upstanding arm portion normally extending through said main lure body means into said chamber to block the first opening in said chamber.

2. The construction of claim 1, wherein said liquid container comprises a soft gelatine capsule containing an oil derived from fish.

3. The construction of claim 2, wherein said oil is cod liver oil.

4. The construction of claim 2, wherein said liquid container contains a fish oil derived from the class consisting of cod, halibut, sharks, tuna, whales, and striped bass fishes.

5. The construction of claim 1, wherein said main lure body means comprises a lower first lure body portion for carrying said hook means and said leader engaging means, and an upper second lure body portion carried by said first lure body portion and having said liquid containing chamber formed therein.

* * * * *